W. CHIPMAN.
SPEED RECORDER.
APPLICATION FILED MAY 19, 1917.

1,267,631.

Patented May 28, 1918.
2 SHEETS—SHEET 1.

INVENTOR.
W. Chipman.
BY J. Edward Maybee.
ATTY.

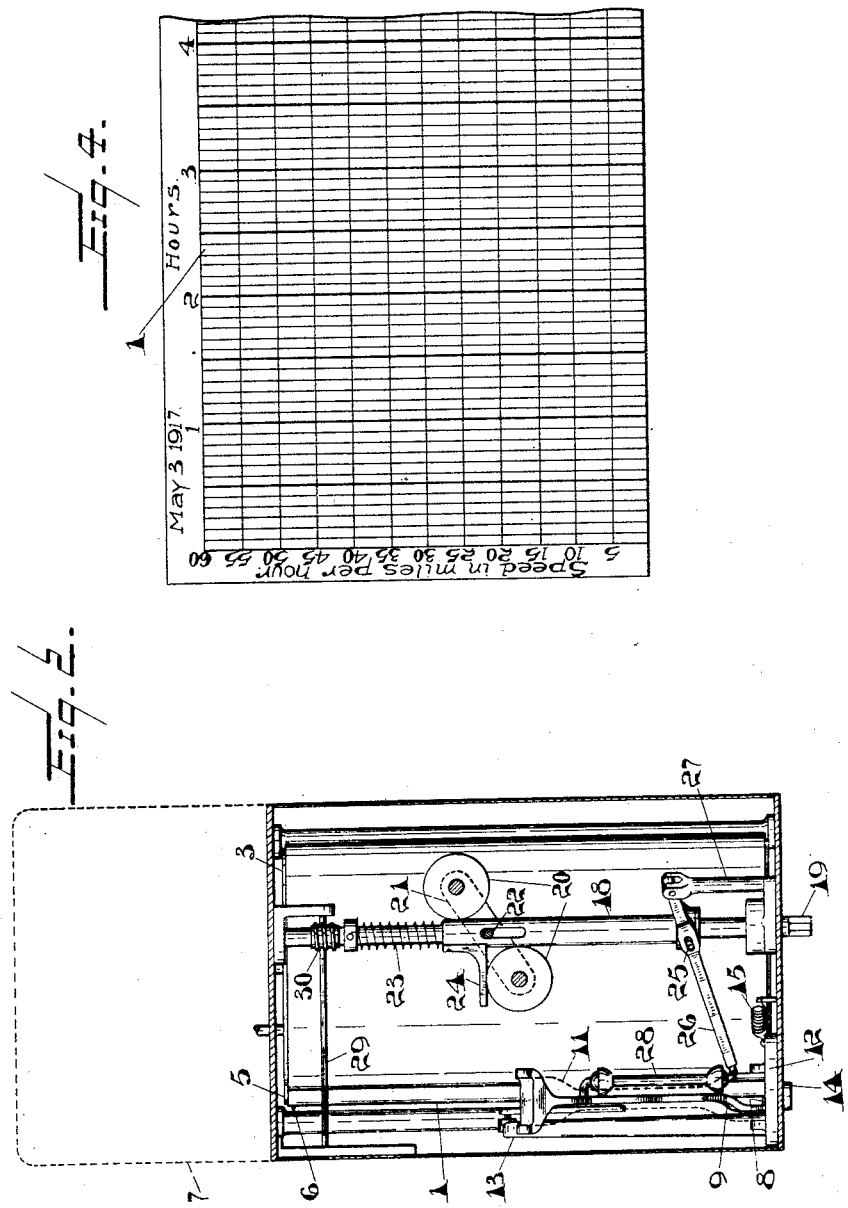

UNITED STATES PATENT OFFICE.

WILLARD CHIPMAN, OF TORONTO, ONTARIO, CANADA.

SPEED-RECORDER.

1,267,631.　　　　　Specification of Letters Patent.　　Patented May 28, 1918.

Application filed May 19, 1917. Serial No. 169,680.

*To all whom it may concern:*

Be it known that I, WILLARD CHIPMAN, of the city of Toronto, in the county of York, Province of Ontario, Canada, have invented certain new and useful Improvements in Speed-Recorders, of which the following is a specification.

This invention relates to means for providing a record in chart form from which may be determined the speed of a vehicle at any given time, and my object is to devise means for obtaining a record of a week's running in such a form that the speed at any time during the week may be ascertained at a glance and without calculation.

I attain my object by means of the constructions hereinafter described and illustrated in the accompanying drawings in which—

Figure 3:
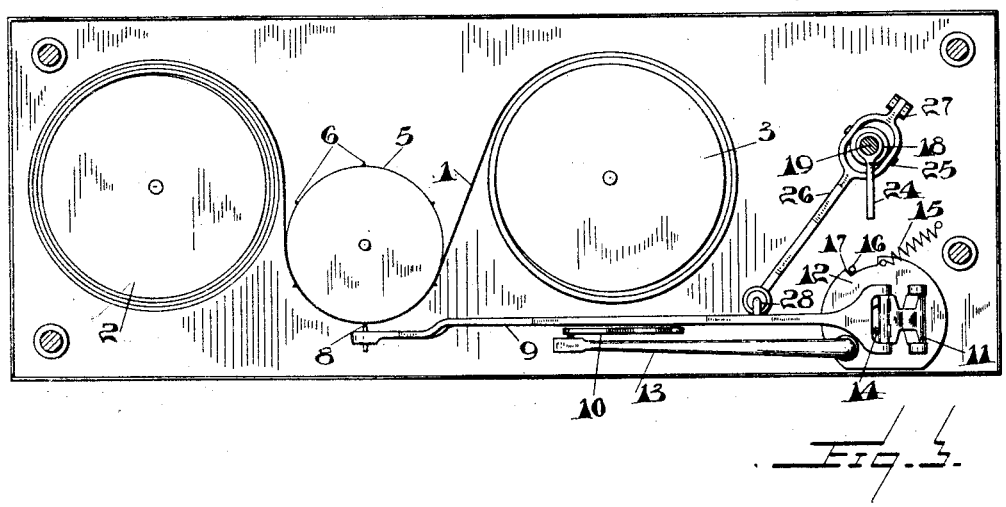
Figure 1:
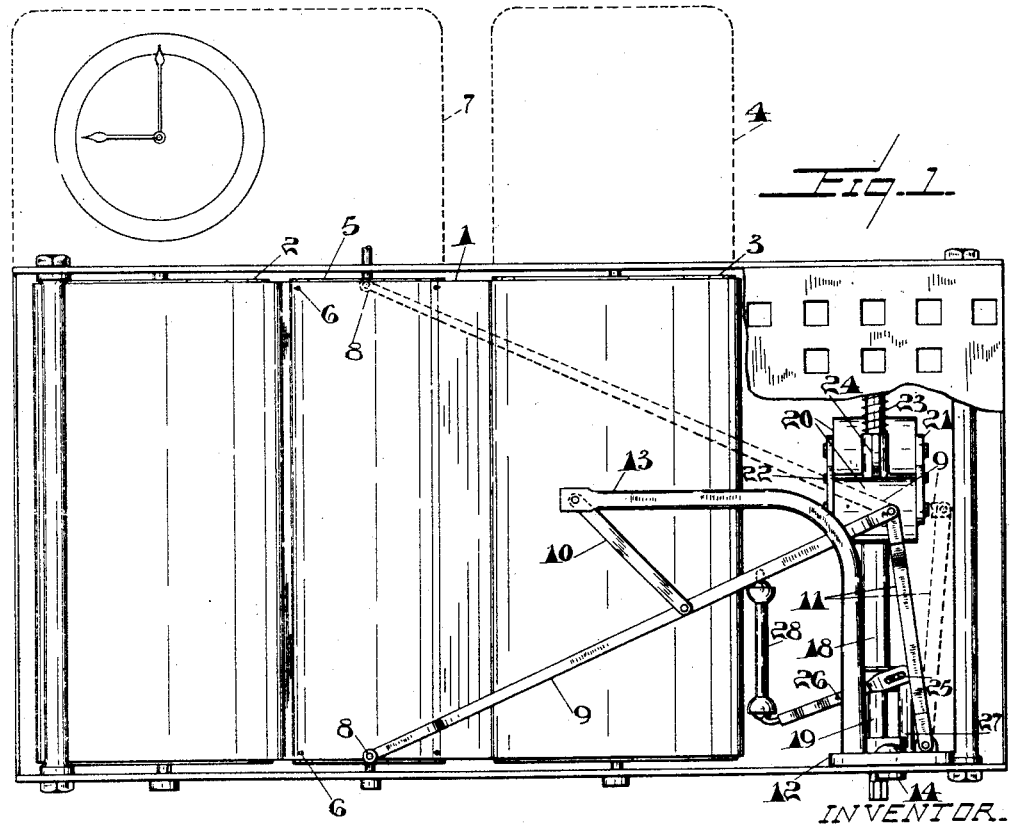

Figure 1 is a front elevation of my improved speed recorder;

Fig. 2 an end elevation of the same;

Fig. 3 a plan view of the same; and

Fig. 4 an elevation of part of a chart showing a record formed thereon.

In the drawings like numerals of reference indicate corresponding parts in the different figures.

In this apparatus I employ a record chart sheet 1 preferably formed as a ribbon adapted to be moved in the direction of its length by the mechanism I will now describe.

2 is a supply roller on which the chart sheet is rolled. From this supply roller the chart sheet passes to a winding roller 3. This winding roller is adapted to be actuated by spring winding mechanism 4, which may be of any ordinary type and is therefore only diagrammatically indicated.

5 is a feed roller which is provided with suitable means for engaging the chart sheet so as to control its rate of winding from the supply roller. Preferably pins or teeth 6 are provided extending radially from the roller at each end and adapted to engage in perforations or to form perforations in the paper sheet as the latter passes in front of the roller. This feed roller is controlled by an ordinary clock movement 7, which is only diagrammatically illustrated.

The feed roller 5, in addition to controlling the rate of movement of the chart sheet, also serves as a tablet to support the chart sheet against the pressure of the recording stylus 8, which may be of any type commonly employed in automatic recording apparatus. This stylus is carried at one end of the stylus arm 9. This stylus arm is carried by links 10 and 11 pivotally connected to the stylus arm and to a support 12, the link 11 being connected to the base of the support and the link 10 to the bent arm 13. The links are so proportioned and pivoted that the stylus is given a parallel motion across the chart sheet parallel to the time graduations thereon. The support 12 is pivoted at 14 to the casing of the apparatus so that the stylus may be readily engaged with or disengaged from the chart sheet. By adjusting the support any desired pressure of the stylus may be obtained.

The friction of the pivot may be sufficient to hold the support as moved, but I prefer in addition to employ a spring, which may be a coil spring such as 15, connected to the support and to a part of the casing. A stop 16 adapted to be engaged by a shoulder 17 limits the inward swing of the support and thus prevents straining of the stylus arm when the latter is engaged with the chart.

The stylus arm is operated from a member whose position depends on the speed of the vehicle to which the recorder is applied. In the preferred arrangement, I employ a rotatable member 18 movable also in a direction parallel to its axis of rotation. This rotatable member is formed as a sleeve on the spindle 19, which spindle will be rotated from a rotatable part of the vehicle to which the device is applied. The member 18 is actuated by the centrifugal weights 20, which are connected by the members 21 pivoted on the spindle 22 extending transversely of the spindle 19. A coil spring 23 bears against the end of the sleeve 18 and against a collar on the spindle 19.

As the spindle 19 rotates, the weights 20 tend to fly outward and thus compress the spring to an extent proportionate to the rate of rotation. One of the weights is adapted to engage an arm 24 projecting from the sleeve 18. This sleeve is thus moved to a position corresponding to the rate at which the spindle 19 is rotated, which corresponds to the rate of movement of the vehicle to which the device is applied.

The motion is conveyed from the sleeve 18 to the stylus by the following means. From the collar on the sleeve project pins 25, which enter slots in the forked lever arm 26. One end of this lever arm is fulcrumed on the post 27, and the other with a universal or ball-and-socket joint engages the lower end of the connecting link 28, the upper end of which is similarly connected with the stylus arm. From the construction as described the operating connection between the stylus arm and the sleeve 18 is maintained no matter what the relative position of the parts may be. The motion of the sleeve 18 will probably be about five-sixteenths of an inch, but the connections to and supports of the stylus arm are proportioned to give a movement of the stylus many times greater so that the chart is obtained on a large scale and therefore easily read.

Any ordinary means may be provided for recording the rotation of the spindle 19 and therefore of the distance covered by the vehicle. Such mechanism is not shown in detail and may be operated by means of the spindle 29 driven by worm gearing 30 on the spindle 19. The clock movement 7 will be provided with the usual dial and hands. The front casing of the device may be provided with suitable glazed apertures through which the record on the chart sheet may be seen.

The chart sheet shown particularly in Fig. 4 is graduated lengthwise for time. Preferably an eight day clock is employed and the chart is of sufficient length to provide a week's record. The horizontal graduations are for speed and may be from zero to sixty miles per hour.

With this device the speed of the vehicle at any moment it is in use may be ascertained without calculation so that an accurate check may be obtained on the actions of the chauffeur or any person in whose charge the vehicle may be.

What I claim as my invention is:

1. In a speed recorder, the combination of a clock driven chart sheet graduated for time and speed; a tablet roller over which the sheet passes; a rotatable member behind the plane of the part of the sheet passing over the roller and movable also in a direction parallel to its axis of rotation and transversely of the sheet, and adapted to take up positions corresponding to the rate at which it is rotated; a sleeve movable by said member; a forwardly extending lever fulcrumed behind the sleeve and actuated by said sleeve; a stylus arm carrying a stylus engaging the part of the chart sheet passing over the roller; parallel motion links pivotally connected to the stylus arm and a suitable support whereby the stylus arm is movable in a plane at an angle to the plane in which the lever moves and the stylus may be moved over the chart in a direction parallel to the time graduations; and a connecting link between the stylus arm and the aforesaid lever having universal joint connections with each.

2. In a speed recorder, the combination of a clock driven chart sheet graduated for time and speed; a tablet roller over which the sheet passes; a rotatable member behind the plane of the part of the sheet passing over the roller and movable also in a direction parallel to its axis of rotation and transversely of the sheet and adapted to take up positions corresponding to the rate at which it is rotated; a sleeve movable by said member; a forwardly extending lever fulcrumed behind the sleeve and actuated by said sleeve; a stylus arm carrying a stylus engaging the part of the chart sheet passing over the roller; a support pivoted to turn on an axis parallel to the time graduations of the chart; parallel motion links pivotally connected to the stylus arm and said support whereby the stylus arm is movable in a plane at an angle to the plane in which the lever arm moves and the stylus may be moved over the chart in a direction parallel to the time graduations; and a connecting link between the stylus arm and the aforesaid lever having universal joint connections with each.

Signed at Toronto this 3rd day of May, 1917.

WILLARD CHIPMAN.

Copies of this patent may be obtained for five cents each, by addressing the "Commissioner of Patents, Washington, D. C."